Feb. 3, 1942.   R. S. NELSON ET AL   2,271,566
ABSORPTION REFRIGERATING APPARATUS
Filed April 13, 1931
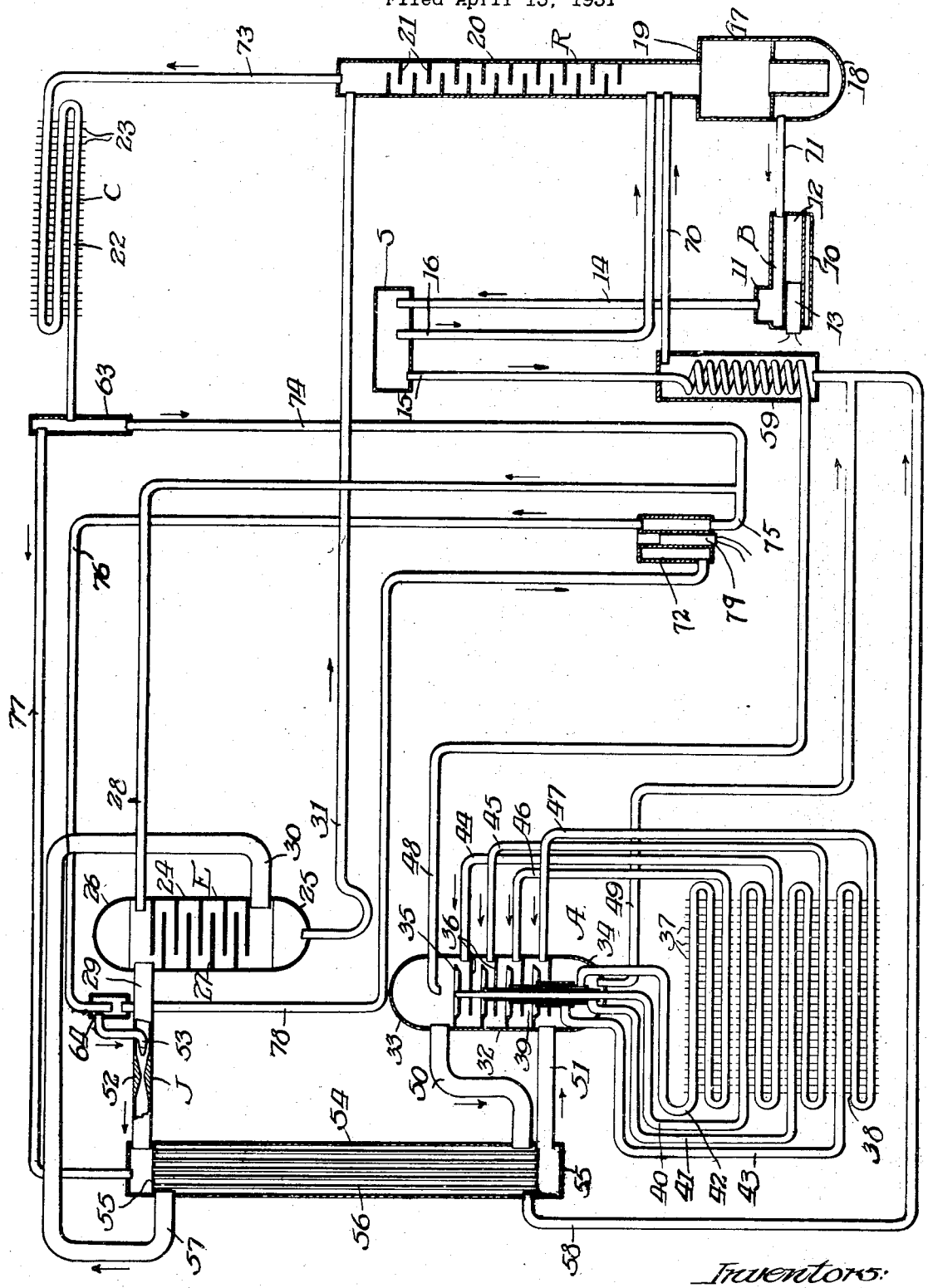
Witness:
R. B. Davison
Inventors:
Rudolph S. Nelson
Kurt U. Nesselmann
By Harry S. Dumars
Atty Patented Feb. 3, 1942

2,271,566

UNITED STATES PATENT OFFICE 2,271,566

ABSORPTION REFRIGERATING APPARATUS

Rudolph S. Nelson, Rockford, Ill., and Kurt V. Nesselmann, Berlin, Siemensstadt, Germany, assignors to The Hoover Company, North Canton, Ohio, a corporation of Ohio Application April 13, 1931, Serial No. 529,616

8 Claims. (Cl. 62—119.5)

This invention relates to continuous absorption refrigerating apparatus and more particularly to that type in which refrigeration is produced in a hermetically sealed system without the use of moving parts.

An object of the invention is to provide a system of the nature referred to in which parts used for conveying heat out of the apparatus are air cooled so as to obviate certain difficulties encountered in the use of water cooled apparatuses on account of the thermostatically operated water valves and cooling water pipes becoming clogged with scale or sediment.

It is well known that in continuous absorption machines of the type which employ an inert gas, as well as those which do not employ an inert gas, the heat is generally dissipated from the apparatus in two places, namely, the condenser and the absorber. The means commonly employed for facilitating the dissipation of heat from these devices has consisted of cooling water pipes passing through them, cooling water jackets around them or where air cooling has been used, radiating fins or the like for providing an extended surface. In small size units such as those now commonly employed in household refrigerators the vessels which dissipate heat, particularly the absorber, must be of relatively small size so that it has been extremely difficult to provide means for dissipating heat therefrom by the use of radiating fins, since it is necessary that the heat radiating surfaces be exposed to a large amount of air. The use of fans or the like for circulating air over the parts of the apparatus presents the obvious objection of increased cost in construction and operation and also increases the liability for breakdowns.

In order to overcome these difficulties and to accomplish the objects of the invention it is proposed to employ what may be termed a multi-stage absorber in which the absorption solution successively comes in contact with refrigerant gases to be absorbed and passes through a heat radiating coil provided with large heat radiating surfaces. The heat radiating surfaces are thus not dependent upon the dimensions of the absorber and adequate cooling may be obtained by the use of air alone.

While the multi-stage absorber referred to above, may be used in any absorption refrigerating system, it is particularly advantageous when used in connection with an inert gas type of apparatus.

Other objects and advantages reside in certain novel features of the construction and arrangement of parts as well as the method employed, as will be obvious from the following description taken in connection with the accompanying drawing in which: the single figure is a diagrammatic representation of an apparatus constructed in accordance with the principles of the invention.

As shown in the drawing the apparatus is made up of various parts which may be designated generally, as a boiler B, the gas separating chamber S, a combined rectifier and receiver R, a condenser C, an evaporator E, an absorber A and a jet J, these devices being connected together by a number of conduits, some of which are in heat exchange relation as will be apparent hereinafter.

Before describing the apparatus as a whole, these devices will be described in detail. The boiler B may be of any suitable construction. As shown, it consists of a cylindrical vessel 10 provided with a dome 11 and having a horizontally extending passageway 12 extending lengthwise thereof for receiving an electric cartridge heater 13 or other suitable means, as a gas burner for heating it. A pipe 14 of small diameter connects the dome 11 of the boiler to the gas separating chamber. Due to the formation of bubbles in the dome 11 and pipe 14 this arrangement constitutes a vapor lift pump for conveying refrigerant solution from the boiler to the separator. This form of pump is now well known to those skilled in the art of refrigeration.

The gas separating chamber may be of any suitable construction. In the drawing it is shown as a drum having two outlets through the conduits 15 and 16 as well as the inlet through conduit 14. The conduit 15 terminates a slight distance below the upper end of the conduit 16. Some heat is transferred from the boiler to the gas separating chamber by convection and this facilitates separation of the refrigerant from the solution. Should this heat transfer be insufficient, additional heating means may be associated with the gas separating chamber.

The combined rectifier and receiver is made of a lower cylinder 17 provided with a semi-spherical bottom 18 and a flat top 19 and a pipe 20 secured to the plate 19. Inside of the pipe 20 plates or disks 21 are secured, these being arranged to provide a tortuous path for the flow of gases therethrough as well as for the unevaporated liquid returned to vessel R through conduit 31. This may be done by cutting away segments of the plates 21 and arranging them in staggered relation.

Any suitable condenser of the air cooled type may be employed, the one shown on the drawing consisting of a reversely bent pipe 22 provided with a plurality of radiating fins 23.

The evaporator E consists of a cylindrical portion 24 provided with end closures of a semispherical shape at the top and bottom as shown at 25 and 26. A series of baffle plates or discs 27 having openings therein are arranged in staggered relation in the cylinder 24, these discs being designated by the number 27. Liquid refrigerant is conveyed to the evaporator through the conduit 28 connected to it near the upper end.

A drain pipe 31 is provided to carry any excess unevaporated refrigerant or solution which may have collected in the lower portion of the evaporator, to rectifier R. This rich solution flows downwardly over baffles 20 in counterflow to the refrigerant and water vapor flowing to condenser C. This results in the cooling and condensation of the water vapor. The very large amount of heat so liberated is utilized to vaporize refrigerant vapor from the rich solution. Thus, the residue liquid from the evaporator is employed to not only rectify the vapors flowing to the condenser, but to also supply a considerable additional amount of refrigerant vapor to the main stream produced in the boiler. And all this is accomplished without extra heat and without dissipating the heat of condensation of the water vapor to a cooling medium.

One of the important features of the invention resides in the arrangement and construction of the absorber A which will now be described. The main body of the absorber consists of a vessel of a shape similar to that of the evaporator being made up of a cylinder 32 and end closures 33 and 34. It might be stated here that the purpose of making these end closures of semi-spherical shape as well as those on the evaporator and the bottom 18 of the receiver 17 is to provide a strong construction adapted to withstand the relatively high pressure existing in the apparatus during operation. Secured to the inside of the cylinder 32 are a plurality of slightly cupped trays 35 and an equal number of disks 36, a disk 36 being arranged below each tray. At a suitable point near the main body of the absorber and exposed to the free circulation of air around them a plurality of cooling coils 37 are provided, these being equal in number to the number of trays in the absorber proper and each having a plurality of radiating fins 38 welded or otherwise secured thereto. As shown in the drawing there are four trays, four disks 36 and four cooling coils 37. Means is provided for causing liquid to flow from the upper tray through one of these cooling coils and back to the disk immediately beneath it. For the purpose of so circulating the absorption liquid drain pipes 39 are connected to the bottom portions of the trays and to pipes which lead to the coils 37. As shown, these drain pipes are arranged concentrically to save space. The drain pipe for the upper tray is connected to the pipe 40; that for the second tray to the pipe 41; that for the third tray to the pipe 42 and the one for the lower tray to the pipe 43. For conveying the solution back to the absorber proper the pipes 44, 45, 46 and 47 connect it to the coils 37, each of these pipes terminating above one of the disks 36.

Absorption solution is brought to the absorber through the conduit 48 and dropped upon the upper tray 35. The solution is carried away from the bottom of the absorber through the conduit 49. Inert gas is circulated through the absorber by means of the conduits 50 and 51 connected to the top and bottom thereof, respectively.

As mentioned above a jet J is used for circulating the inert gas between the evaporator and absorber. To effect this, a portion of the pipe 29 is provided with a restricted portion 52 in the shape of a venturi. A small nozzle 53 is disposed adjacent one side of the venturi and is fed by gas from a suitable source as will be described hereinafter.

In addition to the above elements of the system a number of conduits are provided for conveying fluids between them. These include a gas heat exchanger 54 consisting of a closed cylinder having plates 55 near its end for supporting a plurality of longitudinally extending tubes 56. The conduit 29 is connected to the upper end so that gas leaving the evaporator and forced through the venturi 52 of the jet J may pass downwardly through the tubes 56 and out of the heat exchanger through the conduit 51 to the absorber. Gas from the absorber passes through the conduit 50 into the central portion of the cylinder 54 but on the outside of the tubes 56 and leaves through the conduit 57 connected to the cylinder just below the upper plate 55. A drain pipe 58 is connected to the cylinder just above the lower plate 55 to carry away any liquid which may collect therein.

A heat exchanger for liquids is also provided, this being at 59. This may be of any suitable construction. It is shown as made up of an outer closed cylinder and the coil of pipe disposed therein.

At convenient places, traps are provided for separating gases from liquids, these being shown at 63 and 64. Each consist merely of a small vessel provided with a gas outlet at the top and the liquid outlet at the bottom.

It is of course necessary that charging devices be provided but these have not been shown since their use is obvious. Valves may be used for this purpose. It is also contemplated to regulate the flow of fluids in various conduits by the use of valves.

The apparatus may be charged and operated as follows:

In this apparatus it is preferable to use ammonia, water and hydrogen as the fluids. To place them in the machine commercial aqua ammonia, which has a concentration of about 30% (by weight) is placed in the apparatus until it fills the boiler, receiver, and absorber (including coils 37), as well as the pipes connecting these vessels, up to a height approximately level with the lower portion of the absorber vessel 32. Anhydrous ammonia may then be added to sweep air out of the remainder of the apparatus and to raise the concentration so that during operation the average concentration of the solution will be in the neighborhood of 25%. Hydrogen may then be forced into the evaporator or the absorber until the pressure therein is in the neighborhood of 300 pounds per square inch, it being desirable to operate the apparatus at a total pressure from 300 to 350 pounds because of the fact that the condenser and absorber are air cooled and are at a temperature from 20 to 30 degrees above that of the atmosphere which may be, for example, at a temperature from 75 to 100 degrees F. Upon heat being applied to the boiler, after the charging valves are closed, the pressure may vary in either direction depending upon temperature conditions. Accordingly it may be necessary to trim the apparatus, that is, either add or remove hydrogen until the total pressure is in slight excess of that theoretically necessary to condense ammonia at the temperature prevailing in the condenser.

As heat is supplied to the boiler B, ammonia gas will be expelled from the solution therein and circulation of the solution will take place as follows:

From the boiler B the solution passes upwardly through the conduit 14, through the gas separating chamber, downwardly through the conduit 15, coil of heat exchanger 59, conduit 48 to the upper plate 35 in vessel 32, pipe 40, one of the cooling coils of the absorber, pipe 44, back into the vessel 32, the second tray in the absorber 32, conduit 41 another coil 37, pipe 45 to the third tray in the vessel 32, conduit 42 to another coil, conduit 46 back into the vessel 32 to the lower tray, conduit 43 through the lower coil, conduit 47 back to the vessel 32 into the lower part of the vessel, conduit 49 away from the absorber to the outer portion of heat exchanger 59, pipe 70 into receiver 17 and from the receiver back into the boiler through the pipe 71.

The ammonia gas expelled in the boiler and the gas separating chamber passes downwardly through the pipe 16 into rectifier R. After passing upwardly across the plates 21 the gas is conveyed to the condenser C through the pipe 73. In the condenser, the ammonia is practically all condensed but any portion which is not condensed as well as any hydrogen which may have found its way into the condenser is conveyed from the trap 63 to the heat exchanger 54 through the conduit 77. The main portion of the ammonia condensed in the condenser C flows as a liquid through the trap 63, pipe 74, and pipe 28 into the upper portion of the evaporator E and as it travels down over the plates therein evaporates. At the same time the hydrogen is circulated between the absorber and the evaporator by means of the jet 53 fed by ammonia gas generated in a small auxiliary boiler 72. For this purpose a portion of the ammonia condensed in the condenser C is taken away from the lower end of pipe 74 through the conduit 75 and conveyed to the auxiliary boiler 72. Sufficient heat is supplied to the boiler 72 by a small electric heat 79 to vaporize enough gas to operate the jet, the gas being conveyed to the jet through the pipe 76 and the trap 64. In order to render this gas free of liquid the trap 64 is placed in the gas supply line and a conduit 78 is provided for conveying liquid from the trap 64 back to the boiler 72.

The path of flow of the hydrogen between the evaporator and absorber is as follows:

From the evaporator where it has picked up ammonia gas, the hydrogen flows through the pipe 29 and restricted portion 52 to the upper end of heat exchanger 54, through the tube 56 of this device to the lower end and then through the pipe 51 into the lower end of the absorber. After rising through the absorber and mixing with the absorption solution to enable the latter to absorb a large portion of the ammonia gas brought to it from the evaporator, the relatively pure hydrogen passes out through the pipe 50 into the central portion of the heat exchanger which surrounds the tubes 56 and back to the evaporator through the conduit 57. As it passes upwardly in the evaporator, it picks up more ammonia to complete its cycle. This hydrogen thus flows counter to the liquids in both the evaporator and absorber.

From the above description it will be apparent that this apparatus is particularly designed to provide efficient operation when cooled by air although it is to be understood that certain features are not limited to this form of cooling. It will also be obvious that various changes may be made in the construction and arrangement of parts and manner of operating without departing from the spirit of the invention or the scope of the annexed claims and that various fluids other than those mentioned may be employed. It will also be apparent that the invention is not limited to apparatus in which the refrigerant is condensed before it is conveyed to the evaporator but is also applicable to units which have come to be known as resorber apparatuses. Examples of this type are described in the copending applications of Edmund Altenkirch, Serial Nos. 99,890 and 101,745, filed April 5, 1926, and April 13, 1926, respectively. For this reason, in some of the annexed claims, the words "a device for changing refrigerant in a gaseous phase to a condensed, fluid phase" have been used to designate the condenser since they are broad enough to include a resorber also.

We claim:

1. In an absorber adapted for use in refrigerating apparatus, the combination of a main vessel, a plurality of slightly cupped trays mounted in said vessel and adapted to hold absorption liquid, a baffle plate disposed above each of said trays and a plurality of conduits connected to said vessel, one above each baffle plate whereby absorption liquid may flow from a conduit over a baffle plate, and into a tray.

2. In an absorber adapted for use in refrigerating apparatus, the combination of a plurality of trays and a plurality of drain pipes for the same one drain pipe being connected to each tray and said pipes being disposed so that one is within another.

3. In a refrigerating apparatus, the combination of an evaporator wherein refrigerant may evaporate in the presence of an inert gas, a multi-stage absorber having means for successively cooling an absorption liquid and bringing it into contact with the refrigerant gas, conduits connecting the evaporator and absorber to provide a path for flow of gases in a cycle between them, a jet in one of said conduits, means including a heater for expelling the refrigerant from the absorption liquid, conduits connecting the absorber and said expelling means to provide a path for flow of absorption liquid in a cycle between them, a device connected to said expelling means and the evaporator for changing refrigerant in gaseous phase to a condensed, fluid phase as it passes from one to the other and means for changing a portion of the refrigerant in condensed phase back to gaseous phase and for conducting said portion to said jet to cause positive circulation of gases between said evaporator and said absorber.

4. An air cooled absorber vessel having a plurality of pairs of super-imposed absorption liquid receiving receptacles portions of which are spaced from the walls of said vessel to permit the free flow of gases through the vessel, absorption liquid supply means discharging upon the uppermost receptacle and liquid conveying means leading from the lower portion of the vessel, an air-cooled conduit associated with certain pairs of said receptacles and arranged to convey warm liquid from an upper to a lower receptacle in order to cool said liquid for further absorption, and means for conveying a gas to be absorbed over the liquid in first one receptacle and then another and in counterflow to the flow of absorption liquid through said vessel.

5. In an absorber adapted for use in refrigerating apparatus, the combination of a main vessel having an absorption fluid inlet and outlet, and an inlet for a gaseous fluid to be absorbed, a plurality of baffles in said vessel so constructed and arranged as to provide a plurality of absorption liquid pools and absorption zones therein, each of said zones being in free communication with one another, and a plurality of air-cooled conduits extending from one absorption zone and leading into a different zone and operable to convey one of said fluids out of contact with the other in order to cool the same before the fluids are again brought into contact in a different zone.

6. An absorber vessel having a lean absorption liquid inlet and a rich absorption liquid outlet, means conducting a gas to be absorbed into said vessel, a plurality of spaced apart menas in said vessel arranged to provide shallow pools of absorption liquid, the space overlying each pool constituting an absorption zone and each of said zones being in open communication with one another whereby the gas to be absorbed may flow freely from one zone to another, and cooling conduits extending from one liquid pool to another and having a portion located outside of said vessel so that absorption liquid from one pool is cooled out of contact with the gas being absorbed as said liquid flows to another absorbing zone.

7. An absorption refrigeration apparatus including an evaporator and an air-cooled, multiple stage absorber, conduits providing an inert gas circuit between said evaporator and absorber for conveying refrigerant vapor from the evaporator to the absorber and for returning inert gas from which the refrigerant vapor has been absorbed back to the evaporator, means within said inert gas circuit for positively circulating said gas and vapor therethrough, said absorber having a lean absorption liquid inlet near the upper end and a rich absorption liquid outlet near the lower end thereof, a plurality of spaced apart means in said absorber arranged to provide shallow pools of absorption liquid, the space overlying each pool constituting an absorption zone and each of said zones being in open communication with one another whereby the refrigerant vapor to be absorbed may flow freely from one zone to another, and air-cooled conduits extending from one liquid pool to another and having portions located outside of said vessel so that absorption liquid from one pool is cooled out of contact with the refrigerant vapor being absorbed as said liquid flows to another absorbing zone located at a different elevation than said one pool.

8. An absorption refrigeration apparatus comprising a refrigerant vapor generator, a condenser, an evaporator and a multiple-stage, air-cooled absorber, means connecting said condenser, generator, evaporator and absorber and providing a pressure equalizing medium circuit between the evaporator and absorber and an absorption medium circuit between the generator and absorber, means for circulating the pressure equalizing medium in its circuit and absorption medium in said absorption medium circuit, said absorber comprising a main vessel having an absorption medium inlet and outlet, an inlet and an outlet for the pressure equalizing medium and a gas to be absorbed, a plurality of baffles in said vessel so constructed and arranged as to provide a plurality of absorption medium pools and absorption zones therein, each of said zones being in free and open communication with one another, and a plurality of air-cooled conduits extending from one absorption zone and leading into a different zone and operable to convey one of said mediums out of contact with the other in order to cool the same before the mediums are again brought into contact in a different zone.

RUDOLPH S. NELSON.
KURT V. NESSELMANN.